Figure 1:
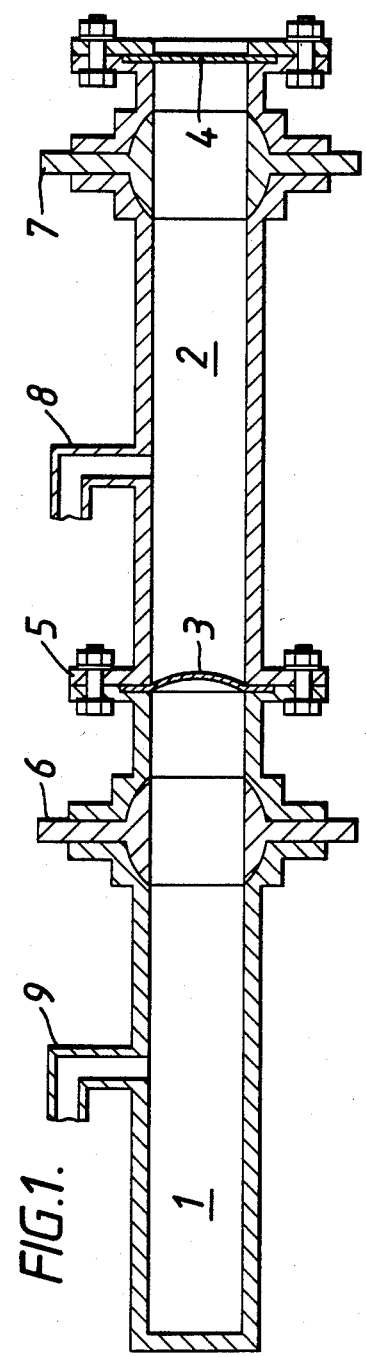

United States Patent [19]

Melvin

[11] Patent Number: 4,667,766

[45] Date of Patent: May 26, 1987

[54] SEISMIC PULSE GENERATOR

[75] Inventor: Alec Melvin, London, England

[73] Assignee: British Gas Corporation, England

[21] Appl. No.: 781,821

[22] Filed: Sep. 30, 1985

[30] Foreign Application Priority Data

Oct. 24, 1984 [GB] United Kingdom ................. 8426917

[51] Int. Cl.$^4$ .............................................. G01V 1/137
[52] U.S. Cl. .................... 181/113; 181/106; 181/118; 367/144
[58] Field of Search ............... 181/106, 110, 111, 113, 181/115, 118, 120, 402; 367/144, 911; 340/385, 386; 124/55, 64, 56; 175/1

[56] References Cited

U.S. PATENT DOCUMENTS

| 560,570 | 5/1896 | Burns | 124/64 |
|---|---|---|---|
| 3,367,442 | 2/1968 | Setser | 181/113 |
| 3,873,938 | 3/1975 | Milling | 330/4.3 |

FOREIGN PATENT DOCUMENTS

| 405645 | 3/1934 | United Kingdom . |
| 654958 | 7/1951 | United Kingdom . |
| 865761 | 4/1961 | United Kingdom . |
| 2027200 | 2/1980 | United Kingdom . |
| 2046910 | 11/1980 | United Kingdom . |
| 2059063 | 4/1981 | United Kingdom . |
| 2075677 | 11/1981 | United Kingdom . |
| 2085163 | 4/1982 | United Kingdom . |
| 2102951 | 2/1983 | United Kingdom . |
| 2107868 | 5/1983 | United Kingdom . |
| 2140560 | 11/1984 | United Kingdom . |
| 2141824 | 1/1985 | United Kingdom . |
| 2143641 | 2/1985 | United Kingdom . |

OTHER PUBLICATIONS

Ewing et al., "Seismic Profiling . . . Sound Source", pp. 4913–4915, Annals. of Geophys. Research, vol. 69, #22, 11/15/64.

Keystone, "Constructions for . . . Well Attachment" 9/84, pp. 1–15 and Drawings, Houston, Texas (Catalog Type).

Primary Examiner—Nelson Moskowitz
Attorney, Agent, or Firm—Larson and Taylor

[57] ABSTRACT

A seismic acoustic source for generating acoustic pulses in both solid rock and sedimentary layers on land and in both water, rock and sedimentary layers at sea comprises: two chambers; a high pressure chamber and a low pressure chamber communicating but separated from each other by, for example, a first diaphragm, the low pressure chamber being closed by, for example, a second diaphragm. The high pressure chamber contains gas e.g. helium at high pressure whereas low pressure chamber contains a gas such as carbon dioxide at a lower pressure. The pulse is generated by bursting the diaphragm separating the two chambers whereupon the shock wave generated in the carbon dioxide then travels to the other end of the low pressure chamber and leaves by over-pressure behind the shock bursting the second diaphragm. Repetitive operation may be achieved by replacing the first diaphragm with a shock wave valve and the second with operable valve means such as an iris diaphragm or full-bore gate valve.

24 Claims, 2 Drawing Figures

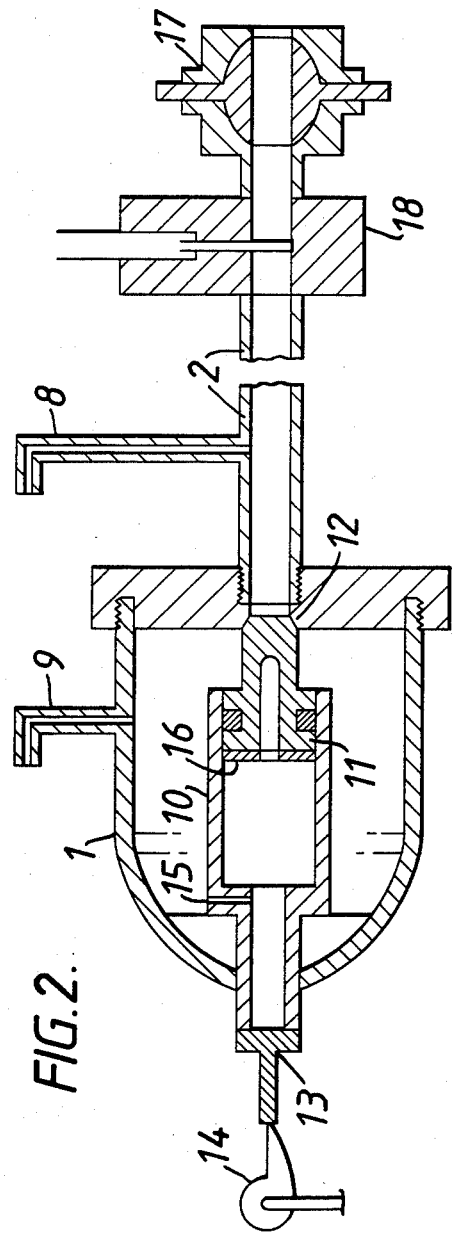

SEISMIC PULSE GENERATOR

This invention relates to the generation of seismic pulses and particularly to apparatus for generating acoustic impulses for seismic exploration both on-shore and off-shore.

There are various types of seismic source for use off-shore. The use of explosive charges is now rare because of the damage caused to fish populations, the danger to ships and personnel, particularly in confined waters, and the expense. The use of explosive gas mixtures to produce either free explosions in water or confined explosions within a flexible container, which is then the source of acoustic pulses, is also a technique which is now less used than at one time. The most-widely adopted off-shore seismic source is the air-gun, in which the pressure in a constainer of high pressure air is suddenly released to generate an air bubble and associated acoustic pulse. Pneumatic and hydraulic systems of various kinds have been developed to control the release of the compressed air. Air pressures required are in the range of 35–550 bars. The acoustic pulse generated in the water then propagates as a near-spherical wave downwards through the water and down through the subsea strata, at the interfaces of which, in sedimentary layers, it is partially reflected back towards the surface. Reflected pulses, detected by geophones at the surface, can be attributed to sedimentary layer structures.

One disadvantage of the air-gun is that the signal can be weak and easily dispersed. In general, air-gun pulses are of low frequency and, although this is no disadvantage for deep seismic exploration, there can be a need for an acoustic source of wider frequency characteristics e.g. for probing shallow sediments. Ideally, the air-gun decompression occurs under isentropic conditions, where the maximum energy is transferred to the acoustic pulse. In practice, designs of air-guns do not permit wholly isentropic operation and the decompression is usually at least partially isenthalpic. There is a need in advanced seismic work for a pneumatic source with high energy in the acoustic pulse comparable with that associated with isentropic expansion and a wide frequency range in the pulse. In order to meet these shortcomings the present invention seeks to provide conditions under which the pressure pulse is generated are comparable with isentropic expansion by a process of achieving operation under non-equililbrium flow conditions using apparatus of novel construction and design.

For on-shore exploration, the air-gun is not conventionally used. There are established mechanical techniques such as Vibroseis and Dinoseis which are of general application. Such on-shore techniques are bulky and expensive both to buy and operate. The present invention also seeks to provide apparatus which can be used in shallow boreholes on land. The apparatus of the invention is cheap and simple to construct and is simple to operate.

In accordance with the present invention there is provided a seismic pulse generator comprising a hollow elongate body arranged to define first and second enclosed chambers communicating with but separated from each other by separating means which are adapted to permit communication between said chambers upon application of a given force, said chambers each being provided with respective gas supply means and wherein said second chamber has an outlet which is adapted to permit passage and egress of gas at pressure in excess of a predetermined threshold.

The present invention also provides a method of producing seismic pulses from a generator having a hollow elongate body arranged to define first and second chambers communicating with but separated from each other by separating means which are adapted to permit communication between said chambers upon application of a given force and wherein said first chamber contains a first gas of predetermined pressure and said second chambers contains a second gas of a predetermine pressure which is less than the pressure of the first gas and is provided with an outlet which is adapted to permit passage and egress of gas upon the application of a pressure greater than than of said second gas but less than that of said first gas, which method includes the steps of positioning the outlet of said second chamber in contact with the medium into which the pulse is to be injected and permitting communication between said chambers, thereby creating a shock in the second gas and permitting passage and an egress of at least a portion of said second gas through said outlet.

In one embodiment, the seismic source generator consists of two chambers, which may be cylindrical, square or rectangular in cross-section, divided, for example, by a gas-tight frangible septum or, diaphragm. In operation, a gas of high sound speed, preferably helium, is contained at high pressure in the first chamber and a gas of lower sound speed, for example carbon dioxide or air or argon is contained at a lower pressure in the second chamber. The separating diaphragm may be a bursting disc of a suitable ductile metal; nickel, for example which may be pre-annealed cold. The generator is then operated by bursting the diaphragm. A shock wave then develops in the gas in the second chamber and travels to the end of this chamber at lower pressure. At the end of the second chamber is an outlet closed off by a second diaphragm chosen in terms of materials and thickness to burst at a predetermined pressure which, usually will be only slightly in excess of the original low pressure. The gas behind the shock wave is then at a pressure sufficently high to burst this second diaphragm. The pressure behind the shock wave is determined by the shock Hugoniot conditions. The shock wave will then leave the chamber as a plane supersonic wave. Typical ranges of initial operating conditions might be, for example, high pressure gas in the range 100–350 bars, and 3–12 bars for the low pressure gas in order to generate pressures behind the shock front in the low pressure gas in the range 35–120 bars. A further option for any given set of initial pressure conditions is to have the exit of the low pressure chamber as a converging conical nozzle. This has the effect of raising the Mach number of the shock and hence the pressure in the carbon dioxide behind the shock. When the shock wave enters the surrounding medium in which the velocity of sound is much higher than in carbon dioxide e.g. water, the shock wave is converted in a distance of centimetres to a sub-sonic acoustic pulse, with the transfer of typically 30% of the acoustic energy. Such a pulse has a wide Fourier frequency spectrum extending from frequencies of the order of 100 Hz to kilohertz.

Conversion of the plane shock front to a sub-sonic pulse will tend to spread the directionality of the pulse, but the solid angle of useful pulse energy as the pulse is propagated downwards is very much smaller than that of a comparable pulse from an air-gun of conventional design. The pulse can then be used for reflection seismology, using established techniques of signal capture and processing.

An alternative method of generating more intense shock waves is to employ, as the high pressure gas, helium partially-diluted with a mixture of hydrogen and air in proportions such that there is still a high percentage of helium in the high pressure chamber but the total mixture now lies within the explosive limits. The gun is fired by igniting this high pressure mixture, the temperature rise resulting in the helium raising the velocity of sound in the helium and hence generating a higher Mach number shock and carbon dioxide pressure pulse for a given helium pressure.

The operation of the generator of the invention automatically provides the opportunity for at least partial compensation at sea for bubble effect phenomena, which are major complications with most undersea sources. After firing, the contact surface behind the rarefaction process in the high pressure gas moves towards the chamber exit in sonic flow and is thus initially delayed in time over the shock front. With the development of the acoustic pulse in the water, the contact surface will catch up and the higher pressure gas will discharge into the bubble. If a full-bore ball valve is installed close to the low pressure chamber exit diaphragm, it is possible to control the rate of discharge of high pressure gas into the bubble, after the exit diaphragm has burst, by arranging for the valve to be rapidly but partially closed to a predetermined aperture by remote operation. This provides a means to control the expansion of the bubble and counter the tendency for "bubble effect" contraction and subsequent irregular oscillation of the pulse at depth. It provides a simple means of "tailoring" the shape of the acoustic pulse.

The generator of the invention is a more effective seismic source than the conventional air-gun, which relies on a partially-isentropic, partially-isenthalphic expansion of air in a non-directional manner such that energy losses or dispersion on forming the pulse are considerable. There is a further advantage in using carbon dioxide over air as the shocked gas in the generator of the present invention. Because of the lower velocity of sound in carbon dioxide over that in air, the gas pressure in the first chamber need be only about three-quarters of those necessary with air as the shocked gas. Hence expensive gases such as helium can be conserved. Helium is a gas carried by exploration and service vessels on a routine basis, since it is used for diving purposes. Carbon dioxide can be easily carried as the vapour over liquid in compressed gas cylinders, thus avoiding the need for a second compressor on the vessel at sea. Argon gives a seismic source performance similar to that of carbon dioxide and may be used as an alternative.

This seismic pulse generator of the invention may also be used on-shore for below-ground reservoir delineation by insertion in a small borehole, e.g. 2 metres in depth. On-shore, single gas guns over a spread of boreholes would form an appropriate configuration. Offshore, multiple gas guns mounted on a submersible raft controlled from the exploration vessel would be more appropriate. The relatively low cost of the gun of the invention makes the use of multiple gas guns economical. Alternatively, if the design of the ship permits, gas-guns may be mounted with the high pressure chamber mounted on a deck-clamped fitting and the low pressure chamber projecting downwards into the water. In this configuration, which is more appropriate for shallow water exploration, the maximum length of the low pressure chamber is limited only by the growth of the boundary layer on the chamber walls behind the shock. If the tube is too long, boundary layer closure occurs, the shock is dissipated and sonic/subsonic viscous flow results. The maximum useful length for the low pressure section is typically of the order of not more than 8 metres for a 50 mm diameter chamber, dependent, of course, on operating conditions.

As an alternative to multiple gas guns of simple construction, a repetitively-pulsed gas gun can be constructed on the basis of the same principle of operation. This uses a shock wave valve of conventional design instead of the diaphragm between the high pressure and low pressure chambers and a pneumatically- or electronically-operated full-bore gate valve instead of the second diaphragm at the exit of the low pressure chamber. Such a generator using conventional designs of components and commercially-available components can operate at up to 140 bar in the high pressure chamber for a 5 cm internal diameter low pressure chamber. Alternatively, an iris diaphragm valve can be used instead of the gate valve.

This device is somewhat less efficient at near-sealevel as a seismic pulse generator than the simple one-shot generator described above for two reasons:

(a) The shock wave valve has a small but finite time of opening and therefore creates a less "clean" shock than the bursting diaphragm. This means that a thicker boundary layer is associated with the shock development, with the resulting possibility of a more rapid boundary layer closure and dissipation of the shock. This problem can be minimised by keeping the low pressure chamber to a sufficiently short length.

(b) The finite time of opening of the gate valve will allow some gas to escape from the pressurised low pressure chamber in the small interval of time between initiating the opening of the gate valve and the firing of the shock. This problem can be compensated for by slight over-pressurisation of the low pressure chamber.

One particular advantage of the repetitive source is the feasibility of operating it as sea depth and even close to the sea-bed in shallow waters. The limitation here is solely the practical lengths of gas lines and electric cables. It is possible, for example, to balance the gas pressure in the low pressure chamber against the hydrostatic pressure of the seawater and eliminate the need for the exit gate valve. Here the depth of operation determines the initial pressure possible in the low pressure chamber, i.e. approximately 1 bar per 32 feet of depth.

The invention will be described in greater detail with reference to the accompanying drawings in which FIG. 1 is a schematic representation of a seismic pulse generator in accordance with one embodiment of the invention, and FIG. 2 is a schematic representation of a second dmbodiment of the invention illustrating a repetitively operated device.

Referring to FIG. 1, the high pressure chamber 1 may be of steel construction, the walls and fittings being designed to thickness and specifications sufficient to allow the chamber to contain safely gas at the desired pressure. A second chamber 2 is connected to the first for example by the flanged sections 5. Alternatively(not shown) where only moderate pressures are involved the chambers may be connected by a ring clamp. Separating the chambers is a bursting diaphragm or septum 3, which is clamped as a gas-tight fitting between the flanges or in the ring clamp. This diaphragm is chosen to be of a thickness for the full tube diameter which will burst either at a given pressure of gas or artificially by a remotely-driven piercing knife.

In the first alternative, the diaphragm may be burst in one of two ways. Firstly, gas e.g. helium, may be pumped into chamber 1 through the gas supply inlet 9 until eventually the pressure of the gas is sufficient to rupture the diaphragm 3 and thus lead to formation of a shock wave which enters chamber 2. In another embodiment, diaphragm 3 is not constructed to withstand high pressures before rupturing, but the high pressure side of the diaphragm is protected by a full bore valve 6 located within chamber 1. With valve 6 closed gas can be pumped into chamber 1 through line 9 to the desired pressure. Valve 6 can then be rapidly opened, subjecting the high pressure side of diaphragm 3 to the full pressure of the gas whereupon it bursts.

In this mode of operation, the specification of the bursting diaphragm is not important and it does not need to be annealed. Any suitable metal can be used as diaphragm material including copper, aluminium, brass and nickel. Of these, nickel is to be preferred since it is ductile, easily preannealed if required and predictable in bursting pressure. The low pressure chamber also may be of steel construction to appropriate specifications. This chamber is provided with a gas supply inlet 8 and is closed at its exit end by a second diaphragm 4. This diaphragm need be of a strength only sufficient to contain the initial pressure of low pressure gas e.g. carbon dioxide and of a bursting pressure well below the pressure of the carbon dioxide behind the shock front generated upon bursting of diaphragm 3. Nickel is again a suitable material and is readily available in the appropriate thicknesses.

Located in front of the diaphragm 4 is a second full bore valve e.g. ball valve 7, which may be of identical construction to that of valve 6. This valve is not normally required if the gun is intended for use on land only. However, for maritime operation it is a highly desirable component. In operation, it is held open during the firing of the gun, but at an appropriate short time after the firing, it is nearly closed to a preset position. This allows the helium behind the contact surface to be released gradually into the carbon dioxide bubble, thus counteracting "bubble effect" implosion and preventing uncontrolled oscillation of the seismic pulse. The ball-valves 6 and 7 are operated remotely by for example an electric servo-system in accordance with conventional practice.

The mode of operation of the gun is then as follows; with both diaphragms in position, the ball-valve 7 fully-open and ball-valve 6, if fitted closed, carbon dioxide is pumped, to the required pressure, via inlet pipe 8 to the low pressure chamber 2 whilst helium, to the required pressure is pumped in via inlet pipe 9 to the high pressure chamber. The diaphragm 3 is then burst. The shock wave develops and exits from the low pressure chamber by bursting the diaphragm 4. In the medium of propagation, whether solid or water, the shock wave is quickly converted to a subsonic acoustic pulse. Ball-valve 7 then automatically closes to a preset position for predetermined time before fully closing. The gas remaining in the chambers can then be vented and a new diaphragm fitted, ready for the next firing. Alternatively, the carbon dioxide can be removed cryogenically and the helium recovered for recompression.

An alternative method of forming more intense shock waves when required is to dilute the pressurised helium with a mixture of hydrogen and air such that the final mixture is preponderately helium but lies within the explosive limits for such a ternary mixture. If this mixture is the ignited by a capacitative spark discharge or exploding wire, the heating of the major component, helium, leads to a greatly increased velocity of sound propagation within it and hence the production of a higher Mach number shock in the carbon dioxide than would be possible with cold helium. The development of a high explosion pressure in the helium will itself rupture the diaphragm 3 and hence no ball-valve 6 or diaphragm-piercing knife would be necessary for this mode of operation.

The construction and mechanical operation of the repetitive seismic pulse version of the gas gun are somewhat more complex, although the same physical principles apply in its operation. FIG. 2 shows the general constructional details of the repetitive pulse generator. It consists of four main items:

(i) a shock wave valve of conventional design which forms part of the high pressure chamber,
(ii) a low pressure chamber cylindrical in shape, of typical dimensions 1 meter or more in length and 5 cm internal diameter,
(iii) a full-bore pneumatically- or electrically-operated gate valve (or alternatively an iris diaphragm), and
(iv) ball-valve, servo-driven as before to control the post-pulse release of gas from the device.

The shock wave valve is constructed in stainless steel of an appropriate specification. It consists of the sealing piston 11 which slides freely in the actuating chamber 10 welded to the back wall of the high pressure chamber 1. The seal to the low pressure chamber 2 is via a 30° metal taper seal 12. The rear exit from the actuating chamber 10 is sealed by a poppet gas-release valve 13, actuated by a motor-driven or hydraulically-driven cam 14. With the poppet valve 13 closed, pressurising the high pressure chamber 1 with helium or alternative gas also pressurises the actuating chamber 10 via the fine-hole gas-leak 15 and seals the piston 11 against the low pressure chamber by virtue of the taper seal 12. With the cam 14 driven into the poppet-valve release position, there is a rapid loss of gas via the low resistance-to-flow rear exit of the actuating chamber 10 while the high resistance-to-flow fine-hole gas-leak 15 prevents the gas pressure in the high pressure chamber 1 from falling appreciably. The imbalance of pressure between the high presure chamber 1 and the section of the actuating chamber 10 behind the sealing piston 11 then drives the sealing piston 11 back to seat on its rubber pad 16 on the rear flat-face of the actuating chamber 10, thus allowing the gas from the high pressure chamber 1 to discharge rapidly into the low pressure section 2. With this section already pressurised with a appropriate gas as described supra, a shock wave froms in the low pressure chamber 2 and propagates as previously described. The control system is arranged so that, first, the low pressure chamber exit ball-valve 17 opens fully, though necessarily rather slowly, and then the gate valve 18 (which, in the alternative may be an iris diaphragm valve) opens rapidly. Only when the gate valve 18 is fully-open at full-bore is the poppet valve release cam 14 driven to fire the shock. The ball-valve 17 is then partially-closed, as described supra to control the rate of gas release subsequent to the seismic pulse formation. If the gas gun is used in operations in water at substantial depth the gate valve 18 may be unnecessary and the device can be fired at leisure at any time after the ball valve 17 is fully-open. The low pressure chamber 2 should be vertical along its length with the exit ball valve at the bottom and that the water depth chosen is appropriate to the initial gas pressure required in the low pressure chamber 2. The seismic pulse generator, in either mode of operation of this embodiment, can then be primed for re-firing by closing the poppet valve 13 by returning cam 14 to its starting position, closing the ball-valve 17, exhausting the gases from both the high pressure chamber 1 and the low pressure chamber 2, pressurising the high pressure chamber 1 to re-seal the piston 11, exhausting any gas which may have entered the low pressure chamber 2 during the last operation and re-pressurising the low pressure chamber 2 to be required pressure with the gas selected.

What is claimed is:

1. A seismic pulse generator comprising a hollow elongate body arranged to define first and second enclosed chambers communicating with but separated from each other by separating means which are adapted to permit communication between said chambers upon application of a given force, said separating means being a removable frangible septum, adapted to rupture upon application of said given force, said chambers each being provided with respective gas supply means, said second chamber having an outlet adapted to permit passage and egress of gas pressure in excess of a predetermined threshold, and including means for piercing the septum.

2. A generator as claimed in claim 1 including sealing means separating the said septum from said first chamber.

3. A generator as claimed in claim 2 wherein the chamber is of cylindrical shape and the sealing means is a full-bore ball valve.

4. A generator as claimed claim 1 wherein said outlet is closed by a second removable, frangible septum, adapted to rupture at said pressure.

5. A generator as claimed in claim 4 including sealing means separating the second septum from said second chamber.

6. A generator as claimed in claim 1 in which said first septum is adapted to rupture on application of pressure exerted by gas in said first chamber.

7. A seismic pulse generator comprising a hollow elongate body arranged to define first and second enclosed chambers communicating with but separated from each other by separating means which are adapted to permit communication between said chambers upon application of a given force, said chambers each being provided with respective gas supply means and wherein said second chamber has an outlet adapted to permit passage and egress of gas pressure in excess of a predetermined threshold, said separating means being a plug which is formed as part of a hydraulically operated piston assembly, which assembly is partly located within said first chamber and includes a means for equalizing the pressure between the hydraulically operated piston assembly and the said first chamber, and relief means for relieving pressure in the hydraulically operated piston assembly, said relief means including a poppet valve venting the hydraulically operated piston assembly to a region of lower pressure than that of the hydraulically operated piston assembly.

8. A generator as claimed in either claim 7 wherein said pressure relieving means is coupled to actuating means adapted for repetitive operation.

9. A generator as claimed in claim 7 wherein said outlet is closed by an operable valve selected from an iris diaphragm, a gate valve or a full-bore ball valve, alone or in combination.

10. A method of producing seismic pulses from a generator having a hollow elongate body arranged to define first and second chambers communicating with but separated from each other by separating means in the form of a removable, frangible septum which is adapted to permit communication between said chambers by piercing the septum, wherein said first chamber contains a first gas of predetermined pressure and said second chamber contains a second gas of a predetermined pressure which is less than the pressure of the first gas and is provided with an outlet which is adapted to permit passage and egress of gas upon the application of a pressure greater than that of said second gas but less than that of said first gas, which method includes the steps of positioning the outlet of said second chamber in contact with the medium into which the pulse is to be injected and rupturing the septum to permit communication between said chambers, thereby creating a shock in the second gas and permitting passage and an egress of at least a portion of said second gas through said outlet.

11. A method as claimed in claim 10 wherein the first gas is helium or an explosive mixture of helium, air and hydrogen.

12. A method as claimed in claim 10 wherein the pre-determined pressure of said first gas is from 100–350 bars.

13. A method as claimed in claim 10 wherein the second gas is air, carbon dioxide or argon.

14. A method as claimed in claim 10 wherein the pre-determined pressure of the second gas is from 3–12 bars.

15. A method as claimed in claim 10 wherein, upon rupturing of the outlet of the second chamber, the egress of gas is controlled after a pre-determined elapse of time.

16. A method of producing seismic pulses from a generator having a hollow elongate body arranged to define first and second chambers communicating with but separated from each other by separating means in the form of a plug which is part of a hydraulically operated piston assembly, which assembly is adapted to permit communication between said chambers by removing the plug from the region which communicates between the said chambers, and wherein said first chamber contains a first gas of predetermined pressure and said second chamber contains a second gas of a predetermined pressure which is less than the pressure of the first gas and is provided with an outlet which is adapted to permit passage and egress of gas upon the application of a pressure greater than that of said second gas but less than that of said first gas, which method includes the steps of positioning the outlet of said second chamber in contact with the medium into which the pulse is to be injected and removing the plug to permit communication between said chambers, thereby creating a shock in the second gas and permitting passage and an egress of at least a portion of said second gas through said outlet.

17. A method as claimed in claim 16 wherein the maximum pressure of the hydraulic system is the same as the pressure of the gas within said first chamber and said piston is actuated, thereby causing said plug to move, by reducing the pressure within the hydraulic system.

18. A method as claimed in claim 17 wherein reduction of pressure within the hydraulic system is controlled by a repetitively operated poppet valve.

19. A method as claimed claim 16 where egress of gas from said outlet is controlled by operation of a valve selected from an iris diaphragm, a gate valve or a full-bore ball valve, alone or in combination.

20. A method as claimed in claim 16 wherein the outlet of the second chamber is positioned in said medium such that the hydrostatic pressure of the medium is equal to the pre-determined pressure of said second gas.

21. A method as claimed in claim 16 wherein the first gas is helium or an explosive mixture of helium, air and hydrogen.

22. A method as claimed in claim 16 wherein the predetermined pressure of said first gas is from 100–350 bars.

23. A method as claimed in claim 16 wherein the second gas is air, carbon dioxide or argon.

24. A method as claimed in claim 16 wherein the predetermined pressure of the second gas is from 3–12 bars.

* * * * *